United States Patent
Byun et al.

(10) Patent No.: US 8,081,980 B2
(45) Date of Patent: Dec. 20, 2011

(54) METHOD AND SYSTEM FOR RECOVERING FROM HAND-OFF FAIL FOR USE IN CDMA 2000 1XEV-DO SYSTEM

(75) Inventors: Jaewan Byun, Ilsan-gu (KR); Jaemoon Lee, Songpa-gu (KR); Jintae Choi, Dongjak-gu (KR); Namgyu Kim, Uiwang-si (KR); Beyongsu Kim, Youngsan-gu (KR)

(73) Assignee: SK Telecom Co., Ltd., Seoul (KR)

( * ) Notice: Subject to any disclaimer, the term of this patent is extended or adjusted under 35 U.S.C. 154(b) by 977 days.

(21) Appl. No.: 10/541,268

(22) PCT Filed: Dec. 12, 2003

(86) PCT No.: PCT/KR03/02718
§ 371 (c)(1),
(2), (4) Date: Apr. 13, 2006

(87) PCT Pub. No.: WO2004/059886
PCT Pub. Date: Jul. 15, 2004

(65) Prior Publication Data
US 2006/0234707 A1   Oct. 19, 2006

(30) Foreign Application Priority Data
Dec. 31, 2002 (KR) .................. 10-2002-0088088

(51) Int. Cl.
*H04W 36/00* (2009.01)
(52) U.S. Cl. ........ 455/436; 455/437; 455/438; 455/439; 455/440

(58) Field of Classification Search .......... 455/436–444; 370/331, 332
See application file for complete search history.

(56) References Cited

U.S. PATENT DOCUMENTS

| | | | | |
|---|---|---|---|---|
| 5,999,816 | A | * 12/1999 | Tiedemann et al. | 455/437 |
| 7,133,675 | B2 | * 11/2006 | Hunzinger | 455/437 |
| 2002/0067707 | A1 | 6/2002 | Morales et al. | |
| 2002/0142772 | A1 | * 10/2002 | Hunzinger | 455/436 |

(Continued)

FOREIGN PATENT DOCUMENTS

CN  00804050.8  1/2000

(Continued)

OTHER PUBLICATIONS

Japanese Office Action for Japanese application No. 2004-562988.

(Continued)

*Primary Examiner* — Kamran Afshar
*Assistant Examiner* — Sayed T Zewari
(74) *Attorney, Agent, or Firm* — Lowe Hauptman Ham & Berner LLP (57) ABSTRACT

A multimedia mobile communication system for recovering a handoff failure comprises: a hybrid access terminal; a base station transceiver subsystem for transmitting and receiving the voice and the data; a base station a mobile switching center a 1xEV-DO transceiver; and an access network controller for controlling the handoff by transmitting a traffic channel assignment signal when there is no response from the hybrid access terminal upon receiving the route update signal from the hybrid access terminal and transmitting the traffic channel assignment signal in response to the route update signal and a packet data serving node.

8 Claims, 5 Drawing Sheets

U.S. PATENT DOCUMENTS

2003/0152049 A1* 8/2003 Turner .................. 370/331

FOREIGN PATENT DOCUMENTS

| | | |
|---|---|---|
| JP | 1994-069862 | 3/1994 |
| JP | 10-108237 | 4/1998 |
| JP | 10-285628 | 10/1998 |
| JP | 11-55722 | 2/1999 |
| JP | 1999-055722 | 2/1999 |
| JP | 2004-515985 | 5/2004 |
| JP | 2005-509325 | 4/2005 |
| WO | WO-02/47399 A2 | 6/2002 |
| WO | WO-02/87268 A1 | 10/2002 |

OTHER PUBLICATIONS

Chinese Office Action dated Aug. 22, 2008, for Chinese application No. 200380110035.0.

* cited by examiner

METHOD AND SYSTEM FOR RECOVERING FROM HAND-OFF FAIL FOR USE IN CDMA 2000 1XEV-DO SYSTEM

FIELD OF THE INVENTION

The present invention relates to a method and a system for recovering an EV-DO system from handoff fail, and more particularly to a method and a system for recovering an EV-DO system from hand-off fail, in which, when hand-off occurs while multimedia services are being transmitted from the EV-DO system to a hybrid access terminal, the EV-DO system transmits a traffic channel assignment signal to the hybrid access terminal several times for realizing the hand-off even if the hybrid access terminal does not respond to the traffic channel assignment signal, thereby improving a success rate of the hand-off.

DESCRIPTION OF THE PRIOR ART

Mobile communication systems have been greatly advanced through $1^{th}$ generation analog-type advanced mobile phone systems (AMPS) and $2^{nd}$ generation cellular/personal communication service (PCS) systems. Recently, international mobile telecommunication-2000 (IMT-2000) systems have been developed and are widely used as $3^{rd}$ generation high-rate data communication systems.

The 3GPP2 ($3^{rd}$ Generation Partnership Project2), which is a collaborative international standardization group, offers standards of a CDMA IMT-2000 system as IMT-2000 standards in order to provide multimedia mobile communication services. According to the above standards, a high rate packet data system called "1×EV(evolution)" based on an HDR (high data rate) proposed by Qualcom Incorporated, has been decided upon as an international standard high rate packet data system. A CDMA 2000 1×EV-DO (data optimized or data only) system has been upgraded from a CDMA 2000 1× system and is designed to transmit only data.

In the following description, the CDMA 2000 1× system is simply referred to as "1× system" and the CDMA 2000 1×EV-DO system is simply referred to as "EV-DO system" for the convenience of explanation.

The 1× system utilizes both circuit networks and packet networks and provides one-way high-rate data services with a maximum transmission rate of 307.2 Kbps. In contrast, the EV-DO system is dedicated for packet data and provides two-way high-rate packet data services with a maximum transmission rate of 2.4 Mbps.

Currently, the EV-DO system has been used together with the conventional 1× system. That is, both of the EV-DO system and the conventional 1× system are installed in one wireless base station or a base station controller even though they are operated separately from each other. In other words, a base station transceiver includes a channel card for the EV-DO system and a channel card for the 1× system, respectively. In addition, the base station controller includes a data processing board for processing packet data transmitted from the EV-DO system and a data processing board for processing data transmitted from the 1× system, respectively.

Accordingly, multimedia data are transmitted to a mobile communication terminal from a mobile communication system, such as the wireless base station or the base station controller, through the EV-DO system. In addition, voice signals or low-rate data are transmitted to the communication terminal through the 1× system.

The user may move into other service sector regions of a base station or may move into service regions managed by the other base station out of the service regions of the base station while the multimedia service is being transmitted to the mobile communication terminal from the EV-DO system. At this time, the mobile communication terminal performs hand-off.

The hand-off is carried out through the mobile communication system in order to switch a communication route of the mobile communication terminal to the base station in such a manner that the mobile communication terminal can continuously make communication with the base station providing services to the mobile communication terminal even if the mobile communication terminal deviates from the service regions or service sectors of the base station.

When the EV-DO system carries out the hand-off with respect to the mobile communication terminal, the EV-DO system must transmit a traffic channel assignment signal to the mobile communication terminal and receive a response message signal from the mobile communication terminal in order to perform the hand-off. If the EV-DO system does not receive the response message signal from the mobile communication terminal, the EV-DO system performs a call drop operation so that the mobile communication terminal cannot make communication with the base station. Accordingly, the mobile communication terminal cannot receive the multimedia services from the EV-DO system. For this reason, a user may again manipulate the mobile communication terminal in order to make communication with the EV-DO system, causing inconvenience to the user.

SUMMARY OF THE INVENTION

Therefore, the present invention has been made in view of the above-mentioned problems, and it is an object of the present invention to provide a method and a system for recovering an EV-DO system from hand-off fail, in which, when hand-off occurs while multimedia services are being transmitted from the EV-DO system to a hybrid access terminal, the EV-DO system transmits a traffic channel assignment signal to the hybrid access terminal several times for realizing the hand-off even if the hybrid access terminal does not respond to the traffic channel assignment signal, thereby improving a success rate of the hand-off.

In order to accomplish the above object, according to a first aspect of the present invention, there is provided a multimedia mobile communication system for recovering an EV-DO system from hand-off fail, the multimedia mobile communication system comprising: a hybrid access terminal making communication with the EV-DO system and a 1× system in order to transmit/receive voice signals or data, transmitting a route update signal to the EV-DO system while a multimedia service is being transmitted thereto from the EV-DO system, and performing a hand-off by transmitting a hand-off response signal to the EV-DO system when a hand-off signal is transmitted thereto from the EV-DO system; a 1× for transmitting/receiving a voice signal or data to/from the hybrid access terminal; a 1× controller for controlling a transmission service of the 1× transceiver; a mobile switching center for providing a communication access route of the 1× system with respect to a communication call from the hybrid access terminal by switching the communication access route; an EV-DO access network transceiver subsystem for transmitting/receiving packet data to/from the hybrid access terminal; an EV-DO access network controller controlling a packet data transmission service of the EV-DO access network transceiver subsystem, receiving the route update signal from the hybrid access terminal while the multimedia service is being transmitted to the hybrid access terminal from the EV-DO access network transceiver subsystem, transmitting a traffic channel assignment signal to the hybrid access terminal in response to the route update signal, and re-transmitting the traffic channel assignment signal to the hybrid access terminal if a response signal (L2ACK) is not transmitted thereto from the hybrid access terminal, thereby performing the hand-off; and a packet data serving node connected to the EV-DO access network controller so as to transmit/receive the packet data to/from the EV-DO system.

According to a second aspect of the present invention, there is provided a method for recovering an EV-DO system from hand-off fail in a multimedia mobile communication system, the method comprising the steps of: (a) performing a packet data transmission between the EV-DO system and a hybrid access terminal in traffic with the EV-DO system; (b) transmitting a route update signal for a hand-off from the hybrid access terminal to the EV-DO system; (c) transmitting a hand-off signal from the EV-DO system to the hybrid access terminal; (d) determining whether or not a response signal for the hand-off signal is transmitted from the hybrid access terminal to the EV-DO system; and (e) re-transmitting a traffic channel assignment signal from the EV-DO system to the hybrid access terminal if the response signal is not transmitted from the hybrid access terminal to the EV-DO system.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the preferred embodiments of the present invention.

In the following description of the present invention, a detailed description of known functions and configurations incorporated herein will be omitted when it may make the subject matter of the present invention rather unclear.

Figure 1:
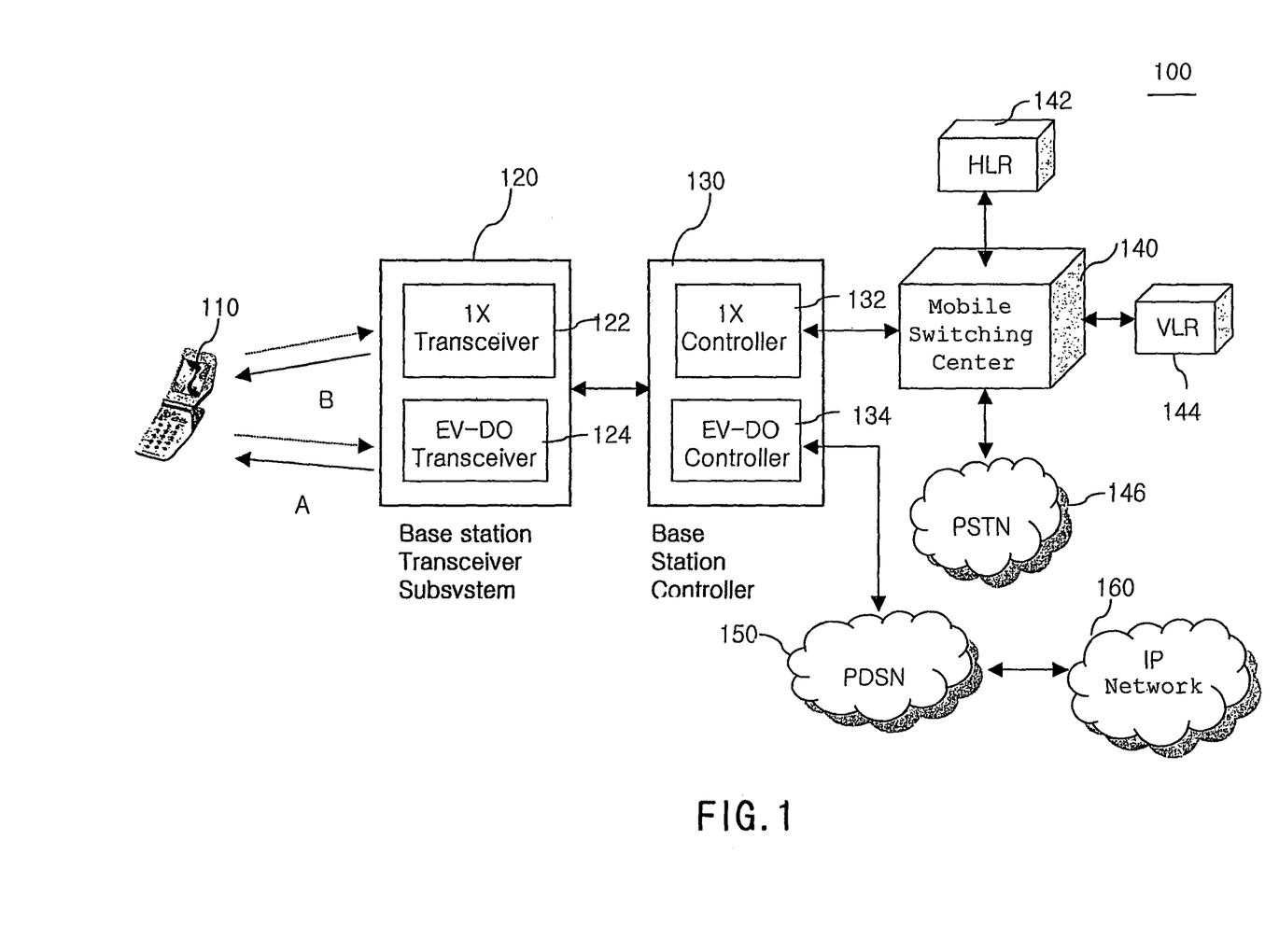
FIG. 1 is a schematic block view showing a multimedia mobile communication system for recovering an EV-DO system from hand-off fail according to an exemplary embodiment of the present invention.

FIG. 1 is a schematic block view showing a multimedia mobile communication system 100 for recovering an EV-DO system from hand-off fail according to an exemplary embodiment of the present invention.

As shown in FIG. 1, the multimedia mobile communication system 100 of the present invention includes both EV-DO system and 1x system. That is, the multimedia mobile communication system 100 has the 1x system making communication with a hybrid access terminal 110 and consisting of a 1x transceiver 122, a 1x controller 132, and a mobile switching center (MSC) 140 in order to transmit voice and data. In addition, the multimedia mobile communication system 100 has the EV-DO system making communication with the hybrid access terminal 110 and consisting of an EV-DO access network transceiver subsystem (ANTS) 124, an EV-DO access network controller (ANC) 134, a packet data serving node (hereinafter, simply referred to as PDSN) 150, and an IP (internet protocol) network 160 in order to transmit data only.

The hybrid access terminal 110 is divided into two parts so that the hybrid access terminal 110 can receive a voice service and a low-rate data service from the 1x system and receive a high-rate data service from the EV-DO system, separately. The hybrid access terminal 110 is switched into a 1x mode when the hybrid access terminal 110 is in an idle state in such a manner that the hybrid access terminal 110 can make communication with the 1x system. In this state, the hybrid access terminal 110 is periodically switched into an EV-DO mode in a predetermined period of time so as to check whether or not data are received through the EV-DO system and returns to the 1x mode.

The switch functions operating between the EV-DO system and the 1x system are controlled by means of software stored in a mobile station modem (MSM) chip, which is a kind of a baseband modem chip accommodated in the hybrid access terminal 110. In addition, the switch functions are achieved by tracking frequencies of each network using a searcher connected to the MSM chip. That is, when the hybrid access terminal 110 is switched from the EV-DO mode into the 1x mode, a searcher module tracks the frequency of the 1x system under the control of the MSM chip. In addition, when the hybrid access terminal 110 returns to the EV-DO mode from the 1x mode, the searcher module tracks the frequency of the EV-DO system.

When the hybrid access terminal 110 receives data from the EV-DO system in the EV-DO mode through a forward link for transmitting data from an access network (AN) to the hybrid access terminal 110, a great amount of messages may be received in the hybrid access terminal 110 through a TDMA (time division multiple access) method. In contrast, in a case of a reverse link for transmitting data from the hybrid access terminal 110 to the access network of the EV-DO system, data are transmitted through a CDMA method for a plurality of subscribers.

In addition, the hybrid access terminal 110 receiving data from the EV-DO system in the EV-DO mode is periodically switched into the 1x mode in a predetermined period of time so as to check whether or not voice signals are received through the 1x system and returns to the EV-DO mode.

If a signal related to handoff, such as a traffic channel assignment signal including a sequence number of a neighbor base station, is received in the hybrid access terminal 110 while the multimedia service is being transmitted to the hybrid access terminal 110 from the EV-DO access network transceiver subsystem 124, the hybrid access terminal 110 transmits a response signal. In addition, if the hybrid access terminal 110 receives a reverse traffic channel signal, the hybrid access terminal 110 transmits a traffic channel off signal to the EV-DO access network transceiver subsystem 124, thereby performing the hand-off.

The 1x transceiver 122 and the EV-DO access network transceiver subsystem 124 form a base station transceiver subsystem (BTS) 120 so as to provide mobile communication services to the hybrid access terminal 110 through an air interface. That is, the base station transceiver subsystem 120 transmits voice or data to the hybrid access terminal 110 through the 1x transceiver 122 and transmits only data to the hybrid access terminal 110 through the EV-DO access network transceiver subsystem 124.

The 1× controller 132 and the EV-DO access network controller 134 form a base station controller (BSC) 130 for controlling mobile communication services of the base station transceiver subsystem 120. That is, the 1× controller 132 for controlling transmission of voice or data connects a plurality of 1× transceivers to the mobile switching center 140 and the EV-DO access network controller 134 connects a plurality of EV-DO access network transceiver subsystems to the PDSN 150 in order to control data transmission.

Particularly, the EV-DO access network controller 134 receives a route_update message from the hybrid access terminal 110 while multimedia data services are being transmitted to the hybrid access terminal 110 from the EV-DO access network transceiver subsystem 124 and transmits a Traffic_Channel_Assignment (hereinafter, simply referred to as TCA) signal to the hybrid access terminal 110 in response to the route_update message. Then, if the hybrid access terminal 110 does not respond to the TCA signal, the EV-DO access network controller 134 again transmits the TCA signal to the hybrid access terminal 110 so as to realize the hand-off.

The mobile switching center 140 physically connects a plurality of 1× controllers 132 to another mobile switching center or to a public switched telephone network (hereinafter, simply referred to as PSTN) 146 so as to provide a communication access route of the 1× system with respect to a communication call transmitted from the hybrid access terminal 110 by switching the communication access route.

In addition, the mobile switching center 140 processes call signals of subscribers by obtaining information of the hybrid access terminal 110 from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals located in a region of the mobile switching center 140.

The EV-DO system, which is a packet data system for transmitting only data, is connected to the PDSN 150 based on TCP/IP so as to transmit/receive various data to/from the IP network 160 through IP packets. In addition, the EV-DO system receives packet data from the IP network 160, creates packets for a packet data service, such as an MPEG packet, based on the packet data, and transmits the packet data to the hybrid access terminal 110 through time slots, which are divided through a TDM method. In addition, the EV-DO system receives CDMA data, which are modulated through a CDMA method, from the hybrid access terminal 110, creates IP packets by using the CDMA data, and transmits the IP packets to the PDSN 150.

The EV-DO system must maximize a throughput in each sector and allot high-rate transmission to each user as possible depending on channel conditions. To this end, one sector provides a service to one user with maximum power. In a case of a forward link, the EV-DO system transmits data with maximum power thereof without using a power control of a base station while providing only a hard handoff function. However, in a case of a reverse link, the power control is carried out in each terminal while providing a softer or a soft handoff function as well as the hard handoff function.

Figure 2A:
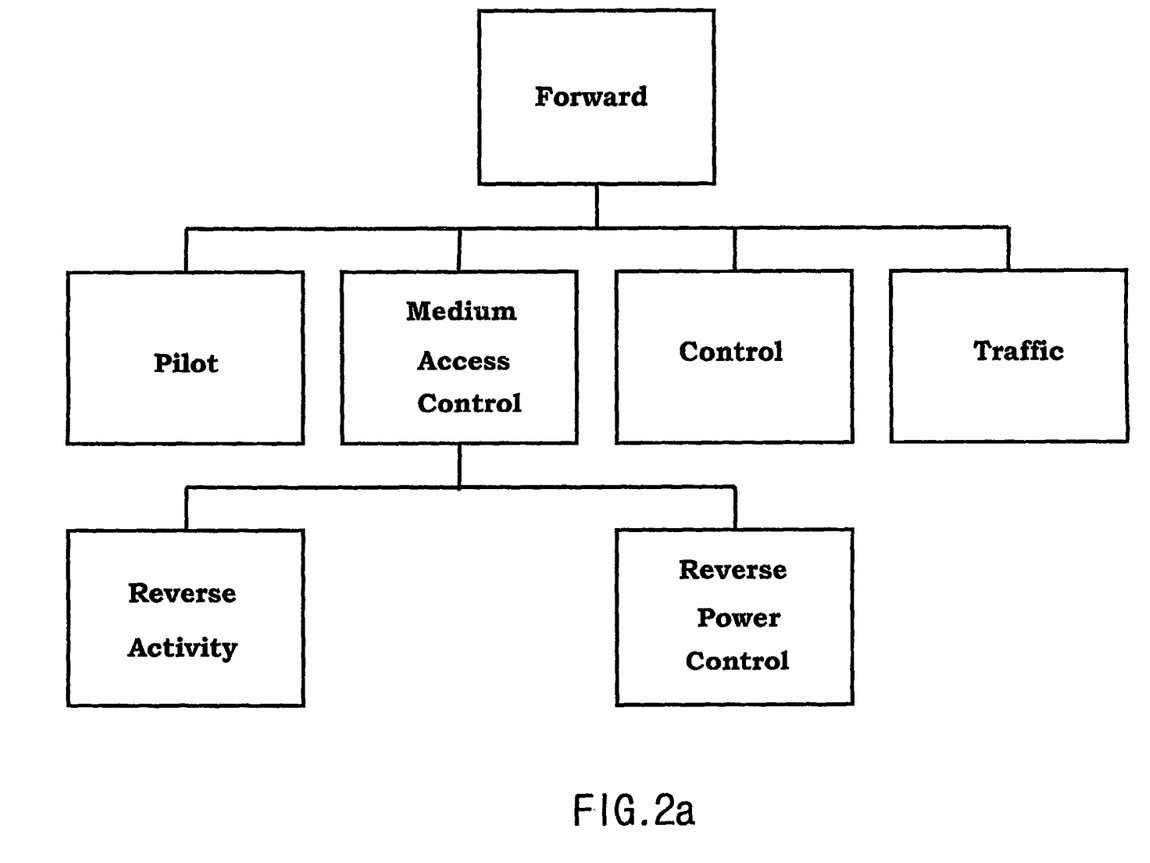
FIGS. 2A and 2B are block views showing a channel structure of a forward link for transmitting data to a hybrid access terminal through an EV-DO access network transceiver subsystem.

FIG. 2A is a block view showing a channel structure of a forward link for transmitting data to the hybrid access terminal 110 through the EV-DO access network transceiver subsystem.

As shown in FIG. 2A, the forward link includes a pilot channel, a medium access control (MAC) channel, a control channel, and a traffic channel. The pilot channel is provided to transmit a pilot signal for allowing the EV-DO system to track the hybrid access terminal 110. The hybrid access terminal 110 receives at least one pilot signal through the pilot channel and accesses to a wireless base station, which has transmitted a pilot signal having greatest intensity. In addition, the pilot channel is used as a reference for coherent detection of the wireless base station having the EV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message or a direct message for directly controlling a specific hybrid access terminal from the EV-DO system to the hybrid access terminal 110. The traffic channel is used when the EV-DO system transmits only packet data to the hybrid access terminal 110.

Figure 2B:
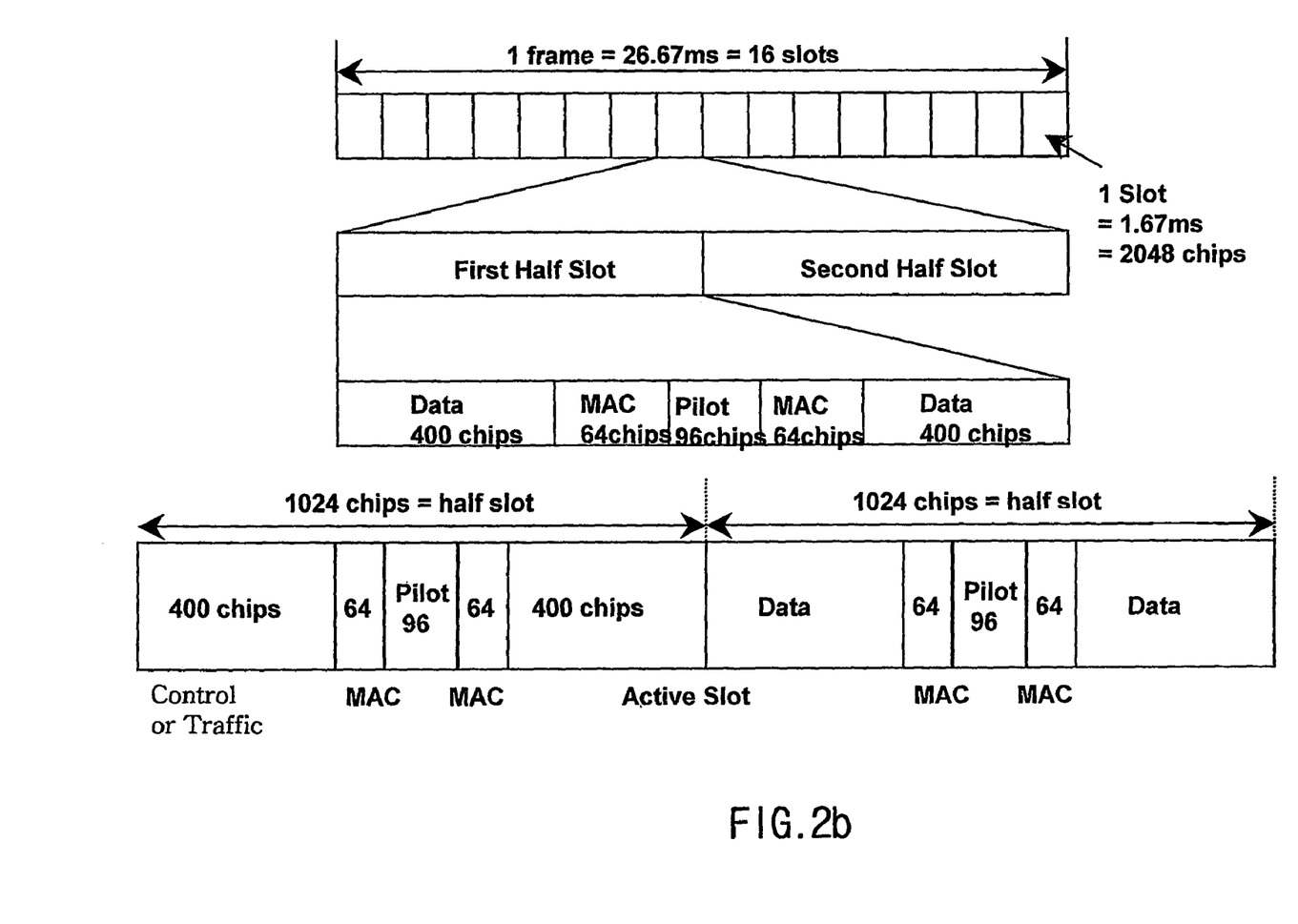

Hereinafter, a time slot structure and a data structure in the forward link will be described with reference to FIG. 2B. Firstly, the forward link includes 16 time slots per one frame having a time interval about 26.67 ms. In addition, each of the time slots includes a first half slot having 1024 chips and a second half slot having 1024 chips, that is, the time slot has total 2048 chips. In addition, a time interval of 1.67 ms is allotted to each time slot.

In detail, each of the first half slot and second half slot includes 400 data slot chips, 64 MAC slot chips, 96 pilot slot chips, 64 MAC slot chips and 400 data slot chips.

Figure 3:
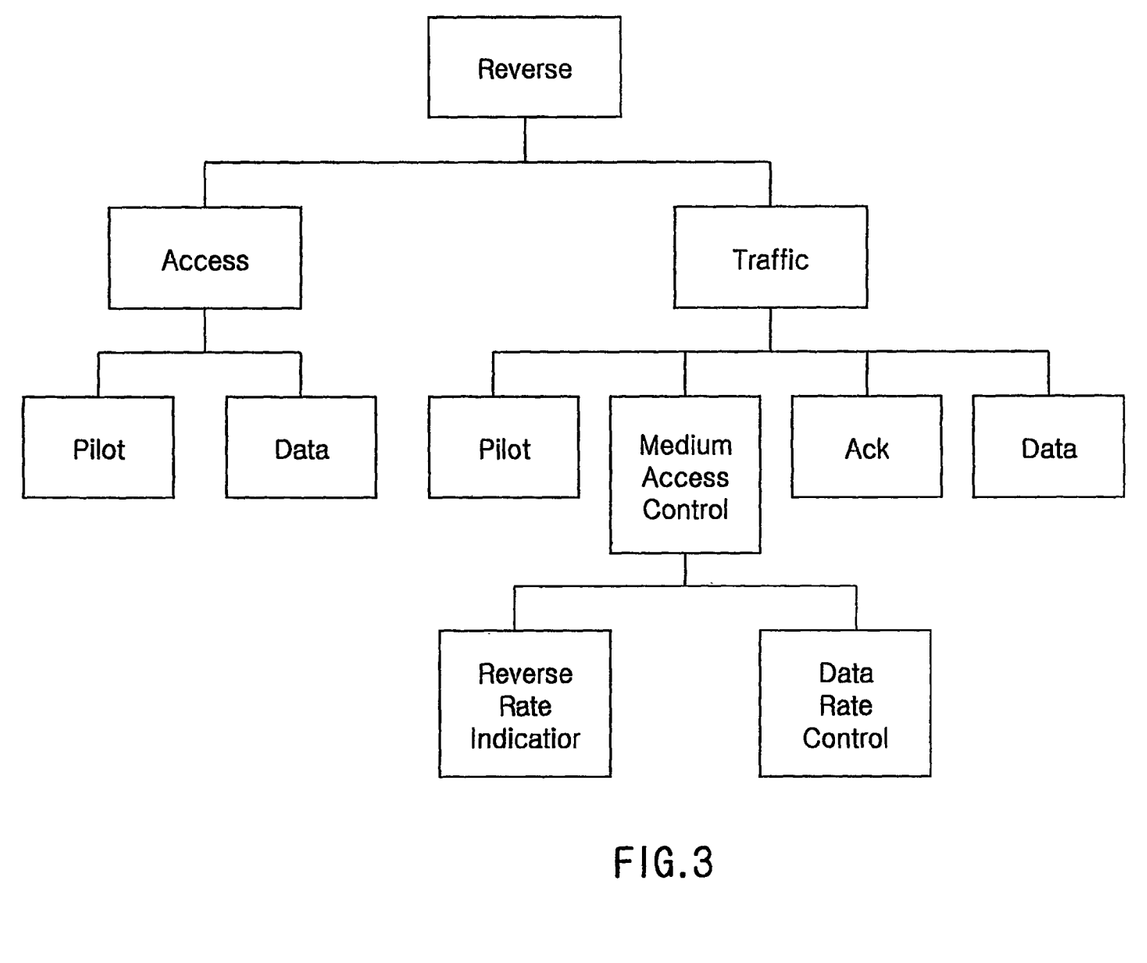
FIG. 3 is a block view showing a channel structure of a reverse link for transmitting data to an EV-DO access network transceiver subsystem from a hybrid access terminal.

FIG. 3 is a block view showing a channel structure of the reverse link for transmitting data to the EV-DO access network transceiver subsystem from the hybrid access terminal 110.

The reverse link shown in FIG. 3 may use a CDMA method in the same manner as the 1× system and mainly include an access channel and a traffic channel. The access channel has a pilot channel and a data channel and the traffic channel has a pilot channel, a MAC channel, an Ack channel, and a data channel. Herein, the MAC channel is again divided into a reverse rate indicator (RRI) channel and a data rate control (DRC) channel.

The access channel is used for transmitting an origination connection_request message, and a registration route_update message. The access channel has a low transmission rate of 9.6 kbps for stability of a wireless channel.

Similar to the pilot channel in the forward link shown in FIG. 2A, the pilot channel shown in FIG. 3 is used as a reference for coherent detection of the wireless base station having the EV-DO system by means of the hybrid access terminal 110. The data channel is used for transmitting data required for the hybrid access terminal 110 to access to the EV-DO system.

The traffic channel is used when the hybrid access terminal 110 transmits packet data to the EV-DO system. The traffic channel provides various data transmission rates depending on the wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the EV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on the channel environment of the forward link and notifies the base station of the data rate. That is, the EV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the EV-DO access network transceiver subsystem 124 and determines the DCR cover value for the maximum transmission rate.

The Ack channel is used for transmitting a response signal for data received in the hybrid access terminal 110 through the forward link in a time slot unit. The Ack channel is adaptable for data having a short length and is corresponding to a half of a length of a time slot so as to reduce interference.

The data channel is used when the hybrid access terminal 110 transmits only packet data as the same as the data channel of the access channel.

Meanwhile, a packet, which is a basic transmission unit of the traffic channel, has a length of 26.66 ms, and a transmission bit rate thereof is varied depending on sizes of the packet. The pilot channel which is used in reverse link, traffic channel, DRC channel and the Ack channel are discriminated from each other by using a Walsh Code.

Figure 4:
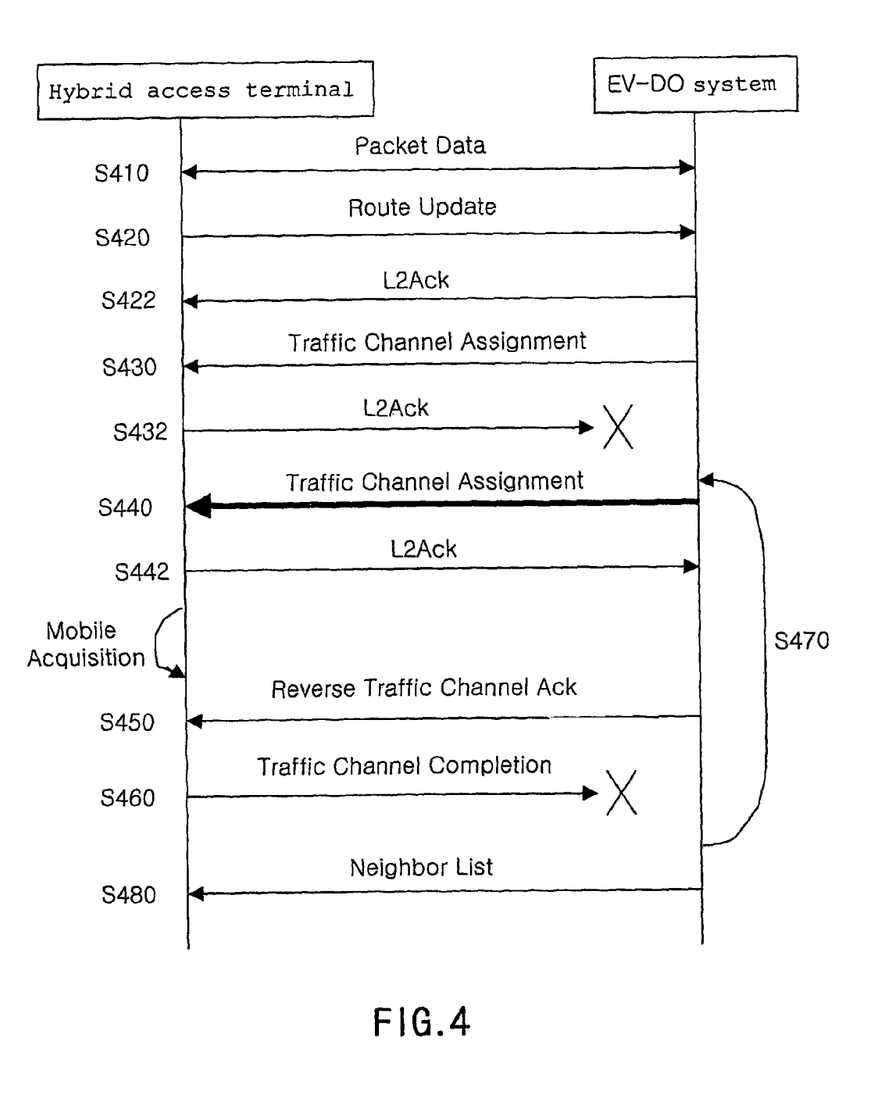
FIG. 4 is a signal transmission flow showing a procedure for recovering an EV-DO system from hand-off fail according to an exemplary embodiment of the present invention.

FIG. 4 is a signal transmission flow showing a procedure for recovering an EV-DO system from hand-off fail according to an exemplary embodiment of the present invention.

When the hybrid access terminal 110 is powered on by a user, the hybrid access terminal 110 receives the pilot signals from the 1× controller 132 and the 1× transceiver 122 of the 1× system so that the 1× mode is initialized and the hybrid access terminal 110 is maintained in an idle state. In addition, the hybrid access terminal 110 initializes the EV-DO mode by using system parameter messages obtained when initializing the 1× mode, and the pilot signals transmitted from the EV-DO access network controller 134 and the EV-DO access network transceiver subsystem 124, and then, the hybrid access terminal 110 is maintained in the idle state.

After initializing the 1× mode and the EV-DO mode, the hybrid access terminal 110 performs a dual monitoring between the 1× mode and the EV-DO mode. At this time, the hybrid access terminal 110 performs the dual monitoring in a period of time about 5.12 under the 1× mode state.

While performing the dual monitoring between the 1× system and the EV-DO system in the idle state, if data are transmitted to the hybrid access terminal 110 from the EV-DO access network transceiver subsystem 124 or the user requests data to the EV-DO system by operating key buttons of the hybrid access terminal 110, it is checked whether or not the EV-DO mode is activated and the hybrid access terminal 110 is entered into a traffic state for receiving/transmitting data. In order to allow the hybrid access terminal 110 to enter into the traffic state, a connection and a session may be formed between the hybrid access terminal 110 and the EV-DO access network transceiver subsystem 124 in such a manner that the hybrid access terminal 110 may transmit/receive data to/from the EV-DO access network transceiver subsystem 124.

The hybrid access terminal 110 transmits a connection request message to the EV-DO access network transceiver subsystem 124 and the EV-DO access network transceiver subsystem 124 sends a connection response message to the hybrid access terminal 110 in response to the connection request message, thereby forming the connection between the hybrid access terminal 110 and the EV-DO access network transceiver subsystem 124.

After that, the session is formed between the hybrid access terminal 110 and the EV-DO access network transceiver subsystem 124 by transmitting a session setting message between the hybrid access terminal 110 and the EV-DO access network transceiver subsystem 124.

If the hybrid access terminal 110 requests packet data or the EV-DO access network transceiver subsystem 124 transmits multimedia data to the hybrid access terminal 110, the hybrid access terminal 110 enters into the traffic state so that the hybrid access terminal 110 can transmit/receive packet data to/from the EV-DO system (S410).

While packet data communication is being carried out between the hybrid access terminal 110 and the EV-DO access network transceiver subsystem 124, if the user having the hybrid access terminal 110 is moved, the hybrid access terminal 110 may be located in an overlay area, which is under the control of the EV-DO access network transceiver subsystem 124 and neighbor base stations.

At this time, the hybrid access terminal 110 transmits a route update (RUP) signal representing power intensity of the neighbor base stations (S420).

The RUP signal includes reference numbers and power intensity values of the neighbor base stations capable of making communication with the hybrid access terminal 110.

Upon receiving the RUP signal from the hybrid access terminal 110, the EV-DO access network transceiver subsystem 124 transmits a L2ACK (layer2 Acknowledge) signal to the hybrid access terminal 110 in order to notify receipt of the RUP signal (S422).

Then, the EV-DO access network transceiver subsystem 124 transmits the TCA signal including sequence numbers of a present base station and an neighbor base station, which are subject to the hand-off, to the hybrid access terminal 110 (S430).

Even though the EV-DO access network transceiver subsystem 124 has transmitted the TCA signal to the hybrid access terminal 110, it may often happen that the hybrid access terminal 110 does not receive the TCA signal due to wave interference or if the hybrid access terminal 110 is located in a shadow zone. In addition, it may occur that the hybrid access terminal 110 cannot transmit the response signal to the EV-DO access network transceiver subsystem 124 even if the hybrid access terminal 110 has received the TCA signal.

After the EV-DO access network transceiver subsystem 124 has transmitted the TCA signal to the hybrid access terminal 110, if the hybrid access terminal 110 does not transmit the L2ACK signal to the EV-DO access network transceiver subsystem 124 (S432), the EV-DO access network transceiver subsystem 124 again transmits the TCA signal to the hybrid access terminal 110 (S440).

If there is no response from the hybrid access terminal 110 even if the EV-DO access network transceiver subsystem 124 again transmits the TCA signal to the hybrid access terminal 110, the EV-DO access network transceiver subsystem 124 may transmit the TCA signal to the hybrid access terminal 110 one more. That is, transmission of the TCA signal to the hybrid access terminal 110 is repeated three times if there is no response from the hybrid access terminal 110.

After that, the EV-DO access network transceiver subsystem 124 provides a traffic channel of the neighbor base station to the hybrid access terminal 110 so that the hybrid access terminal 110 is maintained in a mobile acquisition state capable of receiving/transmitting wireless signals from/to the neighbor base station.

When the EV-DO access network transceiver subsystem 124 receives the response signal from the hybrid access terminal 110 in response to the TCA signal, which is transmitted from the EV-DO access network transceiver subsystem 124 to the hybrid access terminal 110, the EV-DO access network transceiver subsystem 124 transmits a reverse traffic channel (hereinafter, simply referred to as RTC) signal notifying an acquisition of a reverse traffic channel to the hybrid access terminal 110 (S450).

Upon receiving the RTC signal from the EV-DO access network transceiver subsystem 124, the hybrid access terminal 110 transmits a traffic channel completion (hereinafter, simply referred to as TCC) signal notifying a completion of a traffic channel assignment.

However, it may often happen that the hybrid access terminal 110 does not receive the RCA signal from the EV-DO access network transceiver subsystem 124 or it may occur that the hybrid access terminal 110 cannot transmit the TCC signal to the EV-DO access network transceiver subsystem 124 even if the hybrid access terminal 110 has received the RTC signal due to wave interference or if the hybrid access terminal 110 is located in a shadow zone.

If the EV-DO access network transceiver subsystem 124 does not receive the TCC signal from the hybrid access terminal 110 (S460), the EV-DO access network transceiver subsystem 124 returns to step 440 in order to retry the hand-off operation by transmitting again the TCA signal to the hybrid access terminal 110 (S470).

When the EV-DO access network transceiver subsystem 124 has received the TCC signal from the hybrid access terminal 110 through steps 440 to 460 so that the hand-off is realized, the EV-DO access network transceiver subsystem 124 sends a neighbor base station list to the hybrid access terminal 110 (S480).

According to an exemplary embodiment of the present invention, there is provided a method and a system for recovering an EV-DO system from hand-off fail, in which, when hand-off occurs while multimedia services are being transmitted from the EV-DO system to a hybrid access terminal, the EV-DO system transmits a traffic channel assignment signal to the hybrid access terminal several times for realizing the hand-off even if the hybrid access terminal does not respond to the traffic channel assignment signal, thereby improving a success rate of the hand-off.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICATION

As can be seen from the foregoing, according to the present invention, the EV-DO system tries the hand-off for the hybrid access terminal several times while the hybrid access terminal is being connected to the EV-DO system, so the call drop of the hybrid access terminal does not happen when the hand-off occurs in a state in which the hybrid access terminal is in traffic with the EV-DO system.

In addition, according to the present invention, the EV-DO system retries the hand-off for the hybrid access terminal without causing the call drop of the hybrid access terminal, thereby improving the success rate of the hand-off and continuously providing data transmission services.

What is claimed:

1. A multimedia mobile communication system for recovering an EV-DO system from hand-off fail, the multimedia mobile communication system comprising:

a hybrid access terminal making communication with the EV-DO system and a 1× system in order to transmit/receive voice signals or data, transmitting a route update signal to the EV-DO system while a multimedia service is being transmitted thereto from the EV-DO system, and performing a hand-off by transmitting a hand-off response signal to the EV-DO system when a hand-off signal is transmitted thereto from the EV-DO system;

a 1× transceiver for transmitting/receiving a voice signal or data to/from the hybrid access terminal;

a 1× controller for controlling a transmission service of the 1× transceiver;

a mobile switching center for providing a communication access route of the 1× system with respect to a communication call from the hybrid access terminal by switching the communication access route;

an EV-DO access network transceiver subsystem for transmitting/receiving packet data to/from the hybrid access terminal;

an EV-DO access network controller controlling a packet data transmission service of the EV-DO access network transceiver subsystem, receiving the route update signal from the hybrid access terminal while the multimedia service is being transmitted to the hybrid access terminal from the EV-DO access network transceiver subsystem, transmitting a traffic channel assignment signal to the hybrid access terminal in response to the route update signal, and re-transmitting the traffic channel assignment signal to the hybrid access terminal if a response signal (L2ACK) is not transmitted thereto from the hybrid access terminal, thereby performing the hand-off; and a packet data serving node connected to the EV-DO access network controller so as to transmit/receive the packet data to/from the EV-DO system;

wherein, if the response signal (L2ACK) is not transmitted to the EV-DO system from the hybrid access terminal in traffic with the EV-DO system even though the EV-DO system has transmitted the traffic channel assignment signal to the hybrid access terminal, the EV-DO system again transmits the traffic assignment signal to the hybrid access terminal, and if the EV-DO system receives the response signal (L2ACK) from the hybrid access terminal in response to the traffic channel assignment signal, the EV-DO system transmits an acknowledge signal for a reverse traffic channel to the hybrid access terminal, and then, re-transmitting the traffic channel assignment signal to the hybrid access terminal if a traffic channel completion signal is not transmitted to the EV-DO system from the hybrid access terminal, thereby performing the hand-off.

2. The multimedia mobile communication system as claimed in claim 1, wherein the hand-off signal transmitted to the hybrid access terminal from the EV-DO system includes the traffic channel assignment signal having a sequence number of a neighbor base station and an acknowledge signal for a reverse traffic channel.

3. The multimedia mobile communication system as claimed in claim 1, wherein the hybrid access terminal receiving the multimedia data from the EV-DO system is periodically switched into an 1× mode in a predetermined period of time so as to check whether or not voice signals are received through the 1× system, and returns to an EV-DO mode.

4. The multimedia mobile communication system as claimed in claim 1, wherein, in a case of a forward link transmitting data from the EV-DO system to the hybrid access terminal, a TDMA (time division multiple access) method is utilized so as to transmit a great amount of data, and in a case of a reverse link transmitting data from the hybrid access terminal to the EV-DO system, a CDMA (code division multiple access) method is utilized for a plurality of subscribers.

5. A method for recovering an EV-DO system from hand-off off fail in a multimedia mobile communication system, the method comprising:
 performing a packet data transmission between the EV-DO system and a hybrid access terminal in traffic with the EV-DO system;
 transmitting a route update signal for a hand-off from the hybrid access terminal to the EV-DO system;
 in response to the route update signal, transmitting a traffic channel assignment signal from the EV-DO system to the hybrid access terminal;
 determining whether or not a response signal for the traffic channel assignment signal is transmitted from the hybrid access terminal to the EV-DO system;
 re-transmitting the traffic channel assignment signal from the EV-DO system to the hybrid access terminal if no response signal is transmitted from the hybrid access terminal to the EV-DO system;
 after the response signal for the traffic channel assignment signal is received from the hybrid access terminal by the EV-DO system, sending a reverse traffic channel signal from the EV-DO system to the hybrid access terminal;
 determining whether or not a traffic channel completion signal is transmitted from the hybrid access terminal to the EV-DO system in response to the reverse traffic channel signal;
 re-transmitting the traffic channel assignment signal from the EV-DO system to the hybrid access terminal if no traffic channel completion signal is transmitted from the hybrid access terminal to the EV-DO system in response to the reverse traffic channel signal; and
 after the traffic channel completion signal is received from the hybrid access terminal by the EV-DO system, sending a neighbor base station list from the EV-DO system to the hybrid access terminal, thereby performing the hand-off.

6. The method as claimed in claim 5, wherein, in said performing, the packet data transmission between the EV-DO system and the hybrid access terminal is performed by:
 sequentially initializing a 1× mode for making communication with a 1× system and an EV-DO mode for making communication with the EV-DO system of the hybrid access terminal such that the hybrid access terminal stays in an idle state;
 performing a dual monitoring with respect to the 1× mode and the EV-DO mode by using the hybrid access terminal in a state that the hybrid access terminal stays in the idle state; and
 allowing the hybrid access terminal to enter into a traffic state of the EV-DO mode such that a connection and a session are formed between the hybrid access terminal and the EV-DO system, thereby enabling the hybrid access terminal to transmit/receive packet data to/from the EV-DO system.

7. The method as claimed in claim 5, wherein, in said performing, the hybrid access terminal receiving the multimedia data from the EV-DO system is periodically switched into an 1× mode in a predetermined period of time so as to check whether or not voice signals are received through the 1× system, and returns to an EV-DO mode.

8. The method as claimed in claim 5, wherein, in said performing, a TDMA (time division multiple access) method is utilized in a case of a forward link transmitting data from the EV-DO system to the hybrid access terminal so as to transmit a great amount of data, and a CDMA (code division multiple access) method is utilized in a case of a reverse link transmitting data from the hybrid access terminal to the EV-DO system for a plurality of subscribers.

* * * * *